United States Patent
Parlar et al.

(10) Patent No.: US 6,631,764 B2
(45) Date of Patent: Oct. 14, 2003

(54) FILTER CAKE CLEANUP AND GRAVEL PACK METHODS FOR OIL BASED OR WATER BASED DRILLING FLUIDS

(75) Inventors: Mehmet Parlar, Sugar Land, TX (US); Colin J. Price-Smith, Missouri City, TX (US); Raymond J. Tibbles, Missouri City, TX (US); Shrihari Kelkar, Stafford, TX (US); Mark E. Brady, Sugar Land, TX (US); Elizabeth W. A. Morris, Aberdeen (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 117 days.

(21) Appl. No.: 09/778,133

(22) Filed: Feb. 6, 2001

(65) Prior Publication Data

US 2001/0036905 A1 Nov. 1, 2001

Related U.S. Application Data

(60) Provisional application No. 60/183,200, filed on Feb. 17, 2000.

(51) Int. Cl.$^7$ .............................................. E21B 43/04
(52) U.S. Cl. .................... 166/278; 166/300; 166/312
(58) Field of Search ................................ 166/278, 276, 166/311, 312, 300, 304; 175/70, 65, 72; 507/267

(56) References Cited

U.S. PATENT DOCUMENTS

| | | | | |
|---|---|---|---|---|
| 4,000,781 A | * | 1/1977 | Knapp | 166/276 |
| 4,888,121 A | | 12/1989 | Dill et al. | 252/8.553 |
| 5,972,868 A | | 10/1999 | Athey et al. | 510/247 |
| 6,138,760 A | * | 10/2000 | Lopez et al. | 166/300 |
| 6,140,277 A | | 10/2000 | Tibbles et al. | 507/201 |
| 6,143,698 A | | 11/2000 | Murphey et al. | 507/145 |

FOREIGN PATENT DOCUMENTS

| | | | | |
|---|---|---|---|---|
| GB | 2338254 A | 12/1999 | | E21B/37/06 |
| WO | WO 93/24199 | 12/1993 | | B01D/11/00 |

OTHER PUBLICATIONS

09/552,853, Brady et al., "Fluids and Techniques for Hydrocarbon Well Completion" Apr. 20, 2000.

* cited by examiner

Primary Examiner—David Bagnell
Assistant Examiner—Zakiya Walker
(74) Attorney, Agent, or Firm—Catherine Menes; Brigitte Jeffery; John J. Ryberg

(57) ABSTRACT

A method of gravel packing a wellbore which has at least one aperture therein that provides a fluid flow path between the wellbore and an adjacent subterranean formation. At least a part of the formation adjacent to the open hole has a filter cake coated thereon that comprises a water and oil emulsion. The method of gravel packing comprises injecting into the wellbore a gravel pack composition that comprises gravel and a carrier fluid. The carrier fluid comprises an aqueous liquid having a pH that is outside the range at which the filter cake emulsion is stable. The aqueous liquid is present in an amount effective to invert the water in oil emulsion in the filter cake when the carrier fluid comes into contact with the filter cake. As a result, gravel is deposited at or adjacent to the aperture in the wellbore and some of the filter cake is removed. The remainder of the filter cake and the carrier fluid can be broken simultaneously by contact with a breaker fluid that contains at least one of a surfactant and a mutual solvent.

15 Claims, 5 Drawing Sheets

FILTER CAKE CLEANUP AND GRAVEL PACK METHODS FOR OIL BASED OR WATER BASED DRILLING FLUIDS

This application claims the benefit of U.S. Provisional Patent Application Ser. No. 60/183,200 filed Feb. 17, 2000.

TECHNICAL FIELD OF THE INVENTION

This invention relates to compositions and methods used in completing oil and gas wells, especially wells having deviated or horizontal boreholes.

BACKGROUND OF THE INVENTION

Hydrocarbon fluids such as oil and natural gas are obtained from a subterranean geologic formation, i.e., a reservoir, by drilling a well that penetrates the hydrocarbon-bearing formation. Once a wellbore has been drilled, the well must be completed; a completion involves the design, selection, and installation of equipment and materials in or around the wellbore for conveying, pumping, or controlling the production or injection of fluids. After the well has been completed, production of oil and gas can begin.

In deep wells, reliability of the sand face completion is very important, due to the prohibitively high cost of intervention. Further, many such wells are completed open hole. Therefore, gravel packing of open-hole horizontal wells is increasingly becoming a standard practice in the deep-water, sub-sea completion environment. The gravel packing process involves pumping into the well a carrier fluid that contains the necessary amount of gravel. Consequently, gravel is deposited adjacent an open hole, for instance at one end of the wellbore, where it serves to prevent sand from flowing into the wellbore.

Proper selection of the carrier fluid is essential. Ideally, the carrier fluid shall not cause any permeability reduction of the formation. When viscous fluids are used, carrier fluid must also have sufficient viscosity to suspend and carry the gravel during placement. Aqueous-base fluids can be tailored to be compatible with most formations simply by including salts such as potassium chloride or ammonium chloride. Consequently, to date, the convention in gravel-packing such horizontal wells has been water packing or shunt-packing with water-based viscous fluids. A carrier fluid is thus typically a brine comprising a gelling agent such as hydroxyethylcellulose (HEC), xanthan or a viscoelastic surfactant; breakers to minimize the pressure required to move the fluid back to the wellbore.

However, aqueous gravel pack fluids are poorly compatible with oil-based drilling fluids. Typically, the water content of the oil-base drilling fluid will tend to increase upon contact with the gravel pack fluid resulting in an increase of the fluid viscosity and in the formation of sludge. So, to ensure compatibility and improve wellbore cleanup, the section of the well to be gravel-packed is drilled with a water-based drilling fluid so that the drilling fluid residue left on the formation adjacent to the borehole in the form of a filter cake be also water-based. Then, the filter cake may be wholly or partly dissolved by acid wash solution, or as it has been proposed in the British Patent Application 2 338 254 and in the pending U.S. application Ser. No. 09/552,853, Continuation-in-Part of U.S. Pat. No. 6,140,277, by an aqueous wash composition comprising water and an effective amount of cationic salts of polyaminocarboxylic acids at neutral or acidic pH, including for instance ethylenediaminetetraacetic acid (EDTA).

Nevertheless, the use of a water-based drilling fluid is not always suitable or the best recommended practice. Indeed, oil-base drilling fluids provide shale inhibition, lubrication, gauge hole, and higher rates of penetration lubricity and deeper bit penetration and therefore, may often be preferred over water-base fluids. In the art of drilling fluid, the term "oil based" fluids is used to designate fluids having a continuous phase based on synthetic or non-synthetic oil and eventually, an aqueous phase dispersed in the oil phase.

Even though a compromise between the advantages of oil based drilling mud and water based gravel pack carrier fluids can be achieved by drilling the top hole with oil based mud, particularly in shaly zones, then switching to a water based reservoir drilling fluid for the horizontal reservoir section, this fluid swap, from oil based to water based drilling fluid, complicates fluid management on the rig site, increases the risk of fluid incompatibility, and increases overall completion costs.

An alternative method recently practiced offshore West Africa and the Gulf of Mexico, has been to keep drilling with the oil based reservoir drilling fluid even into the horizontal well section, and subsequently displace the oil based fluid with water based fluid in preparation for a water based gravel-pack carrier fluid. This practice can be less expensive than switching to water based reservoir drilling fluid for the horizontal section. However, this technique is still more complex and expensive than desirable and can lead to problems installing the sand exclusion hardware (screens).

There is a need for gravel pack carrier fluids and gravel packing methods that avoid incompatibility issues and eliminate the need for switching from an oil based drilling fluid to a water based drilling fluid, or the need for displacements to water based-fluids.

SUMMARY OF THE INVENTION

One aspect of the invention is a method of gravel packing a hole in a subterranean formation, a part of the formation adjacent to the hole having a filter cake coated thereon, said filter cake comprising an emulsion, said method comprising injecting into the wellbore a composition that comprises gravel and a carrier fluid having an aqueous phase and further comprising the step of breaking or inverting the filter cake emulsion.

Where the carrier fluid comprises an emulsion, said emulsion may be simultaneously broken during the step of breaking of inverting the filter cake emulsion. By simultaneously, it is understood that the breaking occurs during a single treatment, not necessarily rigorously at the same time. For instance, the carrier fluid may comprise a filter-cake breaking additive that is released once the emulsion of the carrier fluid is broken. Consequently, the step of breaking or inverting the filter cake may be completely independent of the step of injecting the gravel pack fluid (injection of a breaking composition) or being a direct consequence of the step of injecting the gravel pack fluid.

According to a preferred embodiment, the aqueous phase of the carrier fluid has a pH that is outside the pH range of stability of the filter cake emulsion. For instance, where the filter cake comprises a water-in-oil emulsion that is stable in a first pH range above about 7 or 8, the aqueous phase of the carrier fluid can include a mineral or organic acid. The aqueous liquid is present in the carrier fluid in an amount effective to invert the emulsion (or residue thereof) in the filter cake when the carrier fluid comes into contact with the filter cake. As a result of injecting the gravel pack composition, gravel is deposited at or adjacent to the aperture in the wellbore and usually at least a portion of the filter cake is removed. "Removal" of filter cake herein means dissolving the filter cake or breaking it apart or loose from the formation, such that fluid can flow more readily.

The filter cake typically contains bridging/weighting agents such as calcium carbonate, barite, salt, or manganese oxide, among others. When the emulsion in the oil-based drilling fluid filter cake inverts, those bridging/weighting agents then come into contact with an increased volume of aqueous fluid from the gravel pack carrier fluid, and as a result they will entirely or largely dissolve. Preferably, the filter cake and/or the carrier fluid also contain one or more surfactants to enhance this wetting (and thus the dissolution) of the bridging/wetting agents. This enhances the overall filter cake cleanup process. In one preferred embodiment, the pH of the carrier fluid is adjusted with a pH-modifying agent that also enhances the solubility of drilling fluid bridging/weighting agents that are present in the filter-cake.

Optionally, the filter cake and the carrier fluid can be broken simultaneously by injecting into the wellbore a breaker fluid composition that comprises at least one of a surfactant and a solvent that is capable of breaking or dissolving both the filter cake and the carrier fluid. The solvent is preferably a mutual solvent that is capable of dissolving components that would otherwise be insoluble. The surfactant(s) preferably is chosen to enhance wetting of bridging/wetting agents in the filter cake. Preferably, the breaker fluid is also capable of dissolving at least some portion of the filter cake.

Suitable pH modifying agents include mineral acids (such as hydrochloric acid), organic acids (such as formic acid, acetic acid, or citric acid), and chelating agents, in particular cationic salts of polyaminocarboxylic acids chelating agents suitable typically using at neutral or mild pH, ranging from 3.5 to 8.0. Examples of chelating agents include aqueous solutions comprising di-cationic salts (and preferably di-potassium salts) of ethylenediaminetetraacetic acid (EDTA), cyclohexylene dinitrilo tetraacetic acid (CDTA), [Ethylenebis(oxyethylenenitrilo)]tetraacetic acid (EGTA, also known as Ethyleneglycol-bis-(beta-aminoethyl ether) N,N'-tetraacetic acid) and [[(Carboxymethyl)imino]-bis (ethylenenitrilo)]-tetra-acetic acid (DTPA, also known as Diethylenetriaminepenta-acetic acid), hydroxyethylethyl-enediaminetriacetic acid (HEDTA). Hydroxyethyliminodi-acetic acid (HEIDA), that has been proposed in U.S. Pat. No. 5,972,868, as a chelant for the removal of alkaline earth scale in downhole equipment can also be used, in a form of free acid or salt. Some of the above mentioned chelants can also be used in an alkaline pH range and thus could be used with filter cake from a drilling fluid emulsion that is stable at low pH and unstable at high pH.

The carrier fluid may be a pure aqueous fluid but is most preferably an emulsion. The carrier fluid can comprise between about 50 and 90% by volume aqueous phase. Preferably, about 50–70% by volume of the carrier fluid is aqueous phase. The water phase may constitute the external continuous either phase of the emulsion (oil-in-water emulsion) or the discontinuous phase (water-in-oil emulsion). Water-in-oil emulsions are preferred since they are fully compatible with oil-base filter cakes. It is believed—though it is understood that the invention should not be limited to this theory, that along time, the water droplets will coalesce so that the emulsion becomes non stable and the water phase will enter into contact with the filter cake emulsion, and finally breaks it.

Where the gravel pack carrier fluid has an external water phase (or its only liquid phase is a water phase), it preferably further comprises a viscosity enhancing agent, for instance a viscoelastic agent gelled in a solution of a chelating agent (such as EDTA). It this latter case, it is recommended to first displace the oil-base drilling mud with displacement fluid that has a composition compatible with the gravel pack carrier fluid and that does not comprise pH modifying agent or a chelating agent; then, the gravel pack carrier fluid will be injected.

Injection of this gravel pack composition into the wellbore results in simultaneous deposition of gravel at or adjacent to the open hole and removal of sufficient filter cake to establish a fluid flow path between the wellbore and the formation. This method is especially useful in wellbores that are drilled with an oil based reservoir drilling fluid and completed open hole, particularly in horizontal boreholes. The present invention has several benefits as compared to prior art gravel packing methods and carrier fluids, including reduced cost, improved fluid management practices, and increased productivity and/or reduced risk of future interventions, by mitigating against the risk of sand face failure.

DETAILED DESCRIPTION OF PREFERRED EMBODIMENTS

Figure 1:
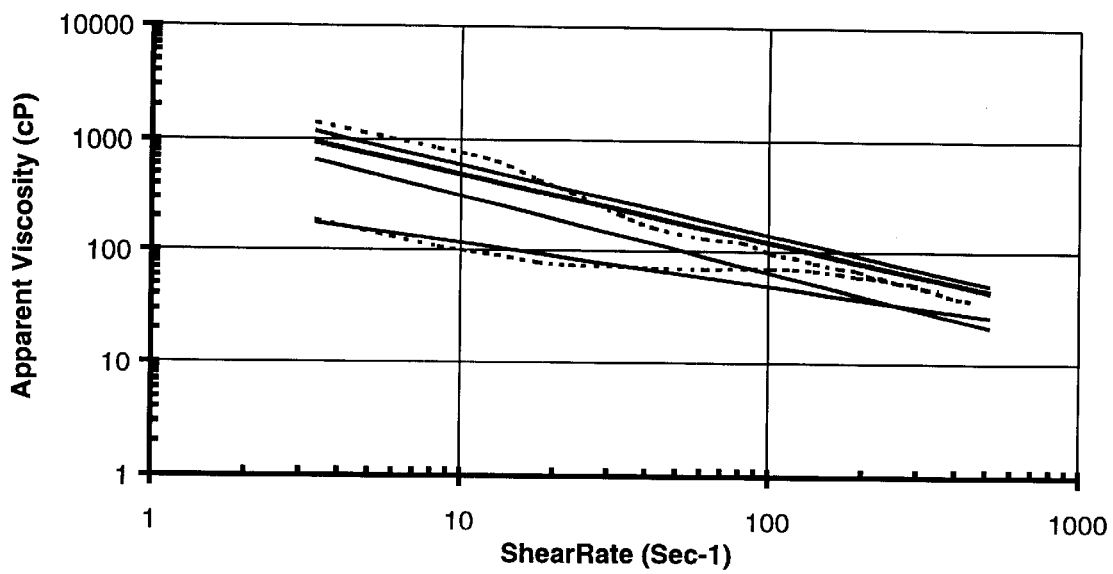
FIG. 1 shows the rheology of oil based gravel carrier fluids at various brine/oil ratios and temperatures.

The present invention provides a method for simultaneous gravel-packing and filter cake removal a wellbore, which has at least one aperture therein. The aperture in the wellbore provides a fluid flow path between the wellbore and an adjacent subterranean formation. In an open hole completed well, the wellbore's open end, that is abutted to the open hole, can be the at least one aperture. Alternatively, the aperture can comprise one or more perforations in the well casing. Although useful in many contexts, the invention is especially useful in horizontal subsea boreholes that have been drilled with an oil based reservoir drilling fluid and completed open hole.

At least a part of the formation adjacent to the aperture has a filter cake coated on it. The filter cake is deposited on the formation during drilling operations and comprises residues of the drilling fluid. If the drilling fluid is essentially an emulsion of water (or more precisely, of an aqueous phase) in oil, the filter cake contains such an emulsion, typically stable in a first pH range (e.g., above pH 7, or below about pH 7). The filter cake can also comprise drill solids, bridging/weighting agents, and viscosifying agents that are residues left by the drilling fluid. Examples of bridging/ weighting agents are calcium carbonate, barite, and manganese oxide, among others. Such bridging/weighting agents can exist as solids in the filter cake. Surfactants and fluid loss control agents, components of certain oil based drilling fluids, can also become part of a filter cake. Same type of additives will be found in water-based drilling fluids.

Gravel pack compositions of the present invention comprise gravel and a carrier fluid. In different embodiments of the invention, the gravel pack carrier fluid can be a water-in-oil emulsion, an oil-in-water emulsion or water based. Preferably the gravel pack carrier fluids have a density that is sufficient to allow the fluid to control the well during well completion operations, since open-hole gravel packing is done almost exclusively in circulating position. Typical fluid densities for the carrier fluid are from about 8.8 ppg (pounds per gallon) up to about 19.2 ppg, more preferably about 8.8 ppg up to 14.2 ppg.

The rheology characteristics of the fluid system preferably are comparable to those of aqueous gravel pack carrier fluids currently used by the industry (viscosified or nonviscosified). The fluid system should be able to carry and suspend gravel.

The gravel will for instance have a U.S. mesh size of between about 20/40 and 40/70. Gravel suspension characteristics preferably are comparable to those provided by aqueous gravel carrier fluids. The fluid system preferably exhibits acceptable friction pressures (pumpability).

The carrier fluid system should be compatible with typical oil based mud and mud additives, so that no thick emulsions or sludges are formed that could damage formations and decrease well production. Thus, for example, the oil phase of the carrier fluid can comprise the same type of oil as the one used in the oil based drilling fluid. Therefore, synthetic oil—comprised for instance of oligomerized olefins—will be preferably used for the carrier fluid if the well was drilled with a synthetic oil based drilling fluid. In addition, the fluid system should have an acceptable health, safety, and environmental profile. In oil comprising carrier fluids of the present invention, the oil of the emulsion can be either synthetic oil (e.g., oligomerized olefin) or naturally occurring oil.

Preferred carrier fluids are typically water-in-oil based fluid, comprising between about 50% and 90% by volume aqueous phase and where the oil is synthetic. The internal aqueous phase is preferably completely solids-free and typically comprises a solution of a pH-modifier as well as a dissolver for the bridging agents from the drilling fluid. The pH-modifying property of the internal phase provides the required break mechanism for the synthetic oil based-reservoir drilling fluid emulsion remaining in the reservoir drilling fluid filter cake. Breaking the emulsion in the filter cake allows the bridging agents and drilling fluid solids to become water-wet, ensuring dissolution of the bridging agents. Thus, the gravel pack carrier fluid provides the chemicals necessary to remove filter cake in order to establish a conductive flow path between the well bore and the formation of interest, while acting as a carrier for the gravel.

As an example of a commercially available oil based drilling fluid, Fazepro reservoir drilling fluid (available from M-I Drilling Fluids, Houston, Tex.) is an oil-external emulsion system that can be inverted to water-external emulsion if it is exposed to pH less than about 7 or 8. When the filter cake is exposed, for example, to an acidic solution, the emulsion inverts and the solid particles therein (e.g., $CaCO_3$, barite, etc.) become water-wet and thus subject to removal through dissolution. Thus, oil based carrier fluids of the present invention comprising acidic aqueous phases can be used to pack gravel, while removing at least a portion of a filter cake that comprises residues of the Fazepro drilling fluid.

Where the drilling fluid is stable in basic conditions, then the carrier fluid will typically comprise an inorganic (e.g., HCl) or an organic acid (e.g., formic, acetic, citric, etc.) or a chelating agent. Vice versa, soda or other base may be used if the filter cake emulsion is stable under acidic conditions. The selection of the dissolver/pH-modifier would depend on particular conditions. For example, if the required carrier fluid density is high (e.g., for well control purposes in circulating gravel packs) and the aqueous phase must contain a concentrated divalent brine such as $CaCl_2$ or $CaBr_2$, then a chelating agent may not be a suitable choice, since it would be consumed on the Ca ions of the brine instead of $CaCO_3$ bridging/weighting agents in the filter cake. For carrier fluids requiring high densities, chelating agent solutions can be used in conjunction with formates or monovalent bromides. HCl can be used in all brines (aqueous phases), and organic acids such as Formic, Acetic or Citric can be used in certain brines. Similarly, if the completion hardware will be exposed to these fluids for prolonged time periods, corrosion may be a concern, and thus use of highly corrosive acids such as HCl may not be suitable.

In certain embodiments, the pH modifying agent used to destabilize (e.g., break) the emulsion in the filter cake also enhances the solubility of drilling fluid bridging/weighting agents that are present in the filter cake, and acts as a dissolver of solids in the filter cake. While bridging/weighting agent dissolvers can be pH modifying agents (e.g., organic and inorganic acids), they can in some cases be chelating agents, like dipotassium EDTA, HEDTA, HEIDA and the like. EDTA can also be used in an alkaline pH range and thus could be used with filter cake from a drilling fluid emulsion that is stable at low pH and unstable at high pH.

As alluded to above, the filter cake can comprise viscosifying agents that were present in the drilling fluid. Thus, the filter cake can comprise at least one of an emulsion, a viscoelastic agent, and a polymer. Similarly, the gravel carrier fluid can comprise viscosifying agents, particularly an emulsion or a viscoelastic surfactant. Preferably, a surfactant package is included in the reservoir drilling fluid to water-wet the drilling fluid bridging/weighting agents (e.g., $CaCO_3$) upon inversion of the emulsion.

Injection into the wellbore of breakers in the present invention is used to break viscosifying agents present in at least one of the filter cake or the carrier fluid. Breakers can be components of the carrier fluid or they can be injected into the well after gravel packing. The emulsion in the gravel-pack carrier fluid itself can be broken using a breaker fluid that comprises a mutual solvent (e.g., 2-butoxyethanol) or a surfactant (e.g., comprising polyglycol ether 23–40%, propan-2-ol 15–25%, 2-butoxyethanol 17–25%, and water 10–30%), if so desired. The mutual solvent preferably can dissolve components that would otherwise be insoluble. A preferred class of mutual solvents is alkoxylated aliphatic alcohols having from 4 to 20 carbon atoms, particularly 2-butoxyethanol. This breaker fluid allows breakage of a viscosifying agent in both the synthetic oil based-reservoir drilling fluid filter cake and the gravel pack-carrier fluid after gravel packing in a single step process, if so desired. For example, in cases where both the filter cake and the gravel pack carrier fluid comprise emulsions, the breaker fluid can simultaneously break the emulsion in both. Such a single step process would result in more uniform cake removal as well as saving valuable rig time.

The breaker solution can, for example, contain a mixture of a mutual solvent and a pH-reducer/$CaCO_3$-dissolver (e.g., a chelating agent solution (e.g., dipotassium EDTA, HEDTA, HEIDA and the like), HCl, organic acid, etc.), where the mutual solvent breaks the gravel pack-carrier fluid such as a ViscoElastic Surfactant (VES) and the pH-reducer/$CaCO_3$-dissolver inverts the emulsion in the reservoir drilling fluid-filter cake, making the particles water-wet and dissolving the particles. In cases where the reservoir drilling fluid does not contain the surfactant package necessary to induce wettability change on solid particles of the cake, a surfactant package may be included, for example, in the internal phase of the synthetic oil based gravel-pack carrier fluid.

It would also be possible to include breakers for the filter cake in the gravel pack carrier fluid, in order to provide uniform cake removal and thus provide more uniform hydrocarbon influx or injection profile.

An alternative method for removal of an oil based filter cake formed by a synthetic oil based reservoir drilling fluid makes use of a carrier fluid that has a continuous aqueous phase comprising a pH-modifier and containing bridging-agent dissolving chemicals. For example, the filter cake of a synthetic oil based-reservoir drilling fluid can be removed using a viscous carrier fluid consisting of a viscoelastic surfactant (VES) gelled in a chelating agent solution (e.g., bridging/weighting agent dissolver), such as an EDTA solution. This combination of additives provide both pH-modification for drilling fluid inversion and water-wettability of the bridging agents, and dissolve the $CaCO_3$ bridging agents. Examples of suitable VES are described in U.S. Pat. No. 6,140,277 (Fluids and Techniques for Hydrocarbon Well Completion, by R. J. Tibbles et al, which is incorporated herein by reference). The viscosifier can also be a polymer that can be gelled in a pH-modifying and bridging-agent-dissolving solution. Similar chelants for other bridging/weighting agents such as barite can also be used.

Optionally, the carrier fluid (oil- or water-based carrier fluid) can further contain one or more additives such as surfactants, corrosion inhibitors, breaker aids, salts (e.g., potassium chloride), anti-foam agents, scale inhibitors, emulsifiers (at between about 0.5 and 3 wt % of the carrier fluid), organophilic clays and bactericides. The aqueous phases of both oil- and water based carrier fluids can comprise brines. The parameters used in selecting the brine to be used in a particular well are known in the art, and the selection is based in part on the density used in the gravel pack carrier fluid in a given well. Brines that may be used in the present invention can comprise $CaCl_2$, $CaBr_2$, potassium formate, ZnBr or cesium formate, among others. Brines that comprise $CaCl_2$, $CaBr_2$, and potassium formate are particularly preferred for high densities.

Specific techniques and conditions for pumping a gravel pack composition into a well are known to persons skilled in this field. The conditions which can be used for gravel-packing in the present invention include pressures that are above fracturing pressure, particularly in conjunction with the Alternate Path Technique, known for instance from U.S. Pat. No. 4,945,991, and according to which perforated shunts are used to provide additional pathways for the gravel pack slurry. Furthermore, certain oil based gravel pack compositions of the present invention with relatively low volume internal phases (e.g., discontinuous phases) can be used with alpha- and beta-wave packing mechanisms similar to water packing.

EXAMPLE 1

A filter cake was formed with Fazepro reservoir drilling fluid (available from M-I Drilling Fluids, Houston, Tex.), a water-in-oil emulsion comprising the following components:

50% by volume synthetic oil (Internal Olefin in C16–C18)
50% by volume brine (brine: 25% by weight $CaCl_2$)
70 lbs/bbl $CaCO_3$
2 lbs/bbl Clay
2 lbs/bbl Lime
surfactant A filter cake was formed with this reservoir drilling fluid using a filter paper at ambient temperature and 500 psi differential pressure for approximately 4 hour time period. The excess reservoir drilling fluid was then replaced by a water-in-oil emulsion gravel pack carrier fluid with an acid aqueous phase, with an approximate 70% and 30% by volume internal and external phases, respectively. The external phase was a refined mineral oil. The internal phase was a mixture 50/50 (by volume) mixture of 14.2 lb/gal $CaBr_2$ brine and 7.5% HCl. The composition of the carrier fluid was (all based on 1,000 gal of mixture):
300 gals of mineral oil
350 gals of 14.2-lb/gal $CaBr_2$ brine
350 gals of 7.5% HCl
20 gals of emulsifier (a fatty acid ester in an aromatic solvent)

The density of this carrier fluid was 10.1 ppg. A 15-psi differential pressure was then applied. The leakoff rate increased rapidly immediately after the application of this 15-psi overbalance. Subsequent visual observation of the cake showed that $CaCO_3$ particles in the filter cake had been dissolved. A similar test conducted with the same oil-external emulsion with the internal aqueous phase containing no pH-reducer/dissolver (brine only) did not lead to increased leakoff throughout the test period, as expected.

EXAMPLE 2

Oil Based Gravel Pack Carrier Fluids

In the tests described below, the drilling fluid was typically a water in synthetic oil emulsion formulated with oil/water ratios from about 50/50 to 80/20. The internal aqueous phase was a brine. Higher brine content in the emulsion can provide similar theological properties, with reduced clay concentration, minimizing the solids content in the reservoir drilling fluid and thus potential damage to completion/reservoir. The lime content was kept at sufficiently high levels in order to maintain alkalinity (thus, oil-external emulsion) while drilling. Typical formulation ranges and the compositions of tested reservoir drilling fluids are shown below in Table 1 below. These synthetic oil based drilling fluids with emulsions capable of being inverted were successfully used in eight wells (injectors and producers) with lengths up to 5,000-ft.

TABLE 1

Synthetic oil based reservoir drilling fluid formulations used in tests.

| | Tested reservoir drilling fluid | Typical Ranges |
|---|---|---|
| Oil/Brine (Vol./Vol.) | 70/30 | 50/50–80/20 |
| Oil Type | Internal Olefin | Internal Olefin |
| Brine Type | CaCl2 | CaCl2, CaBr2 |
| Lime (ppb) | 6 | 4–8 |
| Organophilic Clays (ppb) | 2 | 2 |
| Emulsifier (ppb) | 12 | 10–13 |
| Surfactant (ppb) | 4 | 4–7 |
| CaCO3 (ppb) | 175 | 20–200 |
| Reservoir Drilling Fluid-Density (ppg) | 10.6 | 8–15 |

TABLE 1-continued

Synthetic oil based reservoir drilling fluid formulations used in tests.

| | Tested reservoir drilling fluid | Typical Ranges |
|---|---|---|
| Electrical Stability (mV) | 550 | 400–900 |
| Simulated drill solids [REV Dust] (ppb) | 0–20 | — |

As mentioned earlier, fluid management issues on the rig site can be simplified through the use of a synthetic oil based gravel pack carrier fluid in wells drilled with synthetic oil based reservoir drilling fluids. One of the key requirements of such a carrier fluid is to provide sufficiently high density in order to balance the formation pressure without using any solids. This can be achieved through either the internal phase volume fraction and/or the internal phase type and density, if, for example, an oil-external emulsion system is utilized. Although emulsions with the internal aqueous phase volume fraction exceeding 90% can be formulated, these emulsions become highly shear-sensitive at concentrations greater than about 70% internal phase, getting increasingly more viscous with increased shear rates. Based on these results, an upper limit of approximately 70% was selected for the internal phase volume fraction, and the brine type and density were varied. A typical emulsifier concentration range was about 0.5 to 3 wt %. With these brine volume fractions, densities up to 15.4 ppg can be obtained using a zinc bromide or a cesium formate brine. See Table 2 below.

TABLE 2

Densities attainable with the synthetic/oil-based gravel -pack fluid with a 6.67-ppg base oil.

| Brine Content % | CaCl$_2$ 11.6 ppg | CaBr$_2$ 14.2 ppg | K-Formate 13.1 ppg | ZnBr or Cs-Formate 19.2 ppg |
|---|---|---|---|---|
| 60 | 9.6 | 11.2 | 10.5 | 14.2 |
| 65 | 9.9 | 11.6 | 10.8 | 14.8 |
| 70 | 10.1 | 11.9 | 11.2 | 15.4 |

Another requirement for the emulsion system was to provide sufficient viscosity for transport of gravel through the shunt tubes. Gravel packing fluids according to the present invention were prepared for 70% and 80% brine in a refined mineral oil as the external phase and tested at 150 and 200° F. The apparent viscosity (in CentiPoises) versus shear rate (in sec) are shown FIG. 1 in solid lines, along with two reference curves (dash lines) established through yard testing and field applications. The reference curves were obtained using commercial viscoelastic surfactants as gelling agents. As demonstrated by the data in the figure, an emulsion system with comparable rheological performance to the reference curves can be formulated. The lower limit on the internal phase volume fraction is dictated by the theological performance of the fluid. The rheology of the emulsion was relatively insensitive to temperature.

All the tests for Example 2 were conducted with a 10.6-ppg reversible synthetic oil based reservoir drilling fluid and a 10.6-ppg synthetic oil based gravel pack fluid containing chelating agent solution (CAS) in the internal phase. The gravel pack carrier fluid was 70% brine (a potassium and cesium formate mixture) and 30% refined mineral oil, with 2% emulsifier. CAS concentration was 50% by volume of the internal phase, with a dissolving capacity of about 0.4 lbs of calcium carbonate per gallon of internal phase. This is equivalent to 7.3% HCl in the internal phase.

Figure 2:
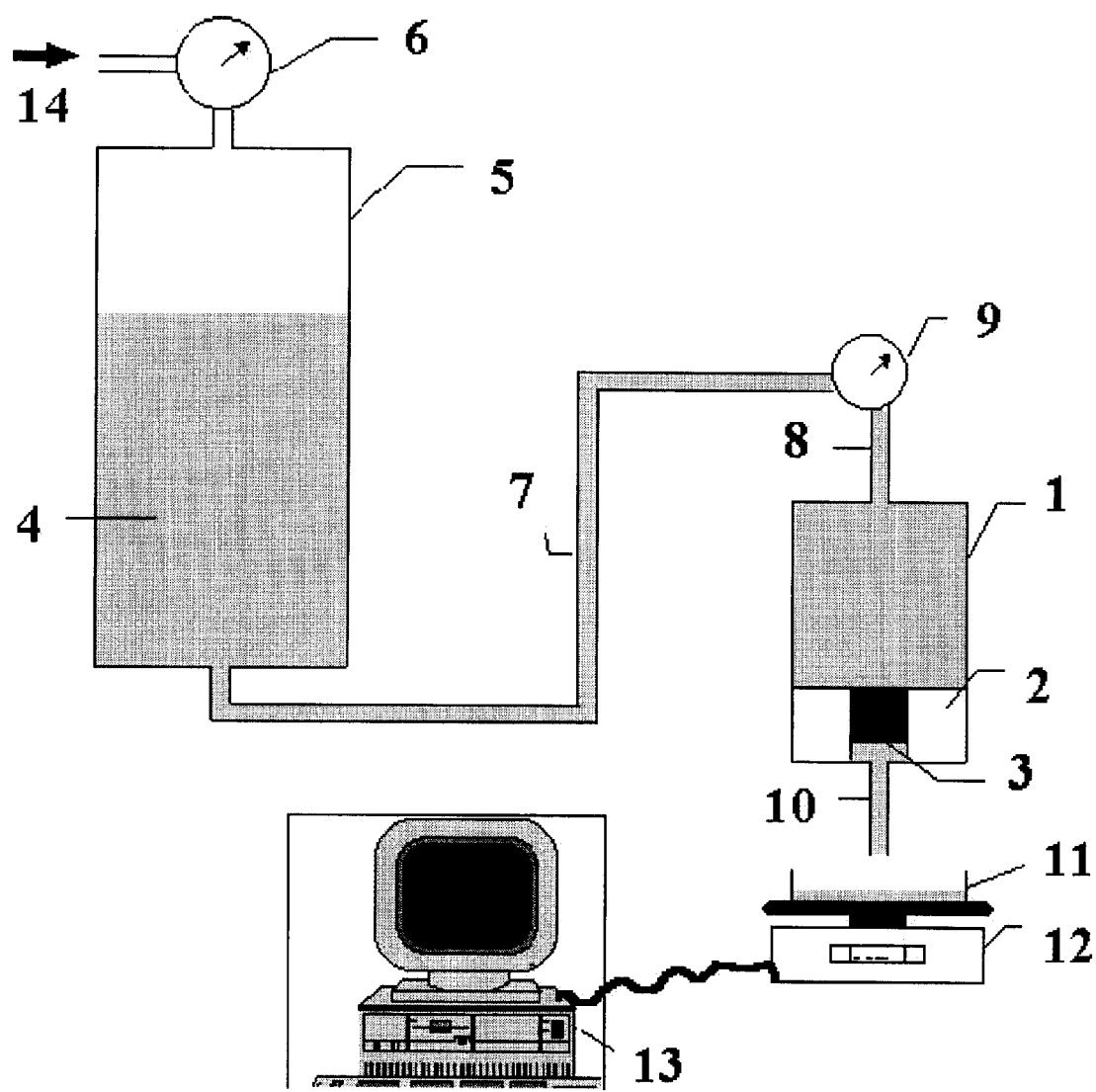
FIG. 2 depicts the equipment used to measure breakthrough properties

The fluids were tested using a measuring apparatus as shown in FIG. 2. A core holder, located in a high pressure/high temperature cell 1, and comprising a pair of jaws 2 tightens a rock core sample 3. The tests were performed using Berea cores of 1-inch diameter and 1-inch length The fluid 4 used in permeability calculation is stored in a pressurized reservoir 5. The pressure in the reservoir 5 is adjusted using a regulator 6 to control gas supply 14. A double U-bend 7 conduit supplies the HT/HP cell 1 with the fluid 4 in the reservoir 5, through an upper valve stem 8. A pressure transducer 9 is provided on the conduit 7 for accurate measurement of pressure difference. The fluid passing through the rock core sample 3 falls through a lower valve stem 10 onto the receptacle 11 of a balance 12 logging to a personal computer 13 to measure and record flow. A flow towards the receptacle 11 simulates leak off. A flow in the opposite direction simulates production.

The cores were vacuum-saturated with 2% KCl solution over night. Then, kerosene was injected until residual brine saturation was obtained, and the permeability to kerosene was determined. Kerosene permeabilities were typically about 500 md. Subsequently, a filter cake was formed on the core at 300-psi overbalance (unless noted otherwise) at either 170 or 200° F. over a typical mud-off period of 16-hour. The mud-off period is the time during which the filter cake is allowed to build during the test. The filter cake was formed with a reversible synthetic oil based reservoir drilling fluid using a modified High Pressure—High Temperature static fluid loss cell. At the end of the mud-off period, the excess reservoir drilling fluid was poured out of the cell. Then, a gravel slurry with the synthetic oil based carrier fluid incorporating a pH-modifier/CaCO$_3$-dissolver (chelating agent solution) was placed on top of the filter cake, with some excess carrier fluid left above the gravel pack to simulate the fluid left in the base pipe at the end of gravel-packing. The gravel was 20/40 U.S. mesh unless noted otherwise. The cell was then pressurized and the leakoff volume was recorded as a function of time.

The overbalance during the soak period was either 300 or 25 psi. Simulated drill solids (rev dust) were added to the reservoir drilling fluid formulation, in ratio ranging from 0 to 20 lb/bbl. After breakthrough, kerosene was flowed through the core in production direction to obtain a composite (core/gravel-pack) permeability. The composite cake/gravel-pack/core permeability was compared to the initial permeability.

Figure 3:
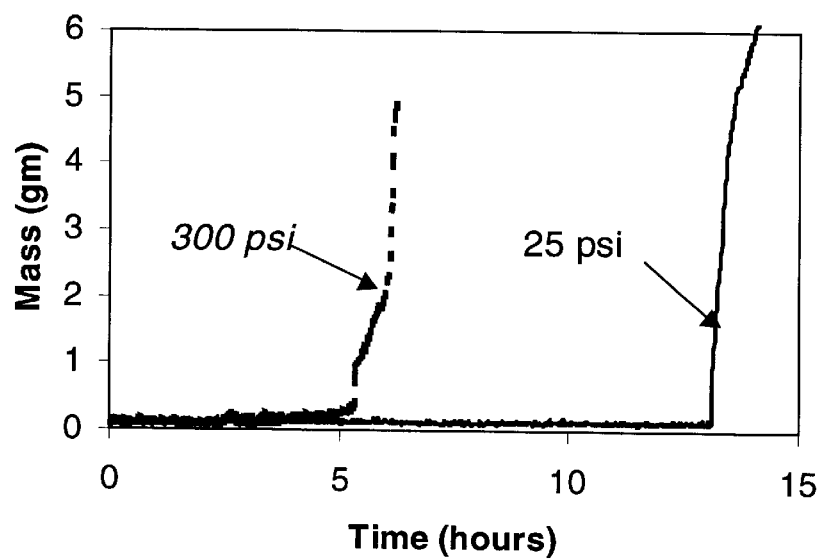
FIG. 3 shows the effect of soak overbalance on filter cake breakthrough kinetics.

FIG. 3 depicts the effect of soak overbalance (see curve labels, given in pounds per square inch or psi) on cleanup fluid (Y-axis, measured in grams) breakthrough times (X-axis, measured in hours). At 300-psi soak overbalance conditions, breakthrough occurs in 5 hours compared to 13-hours with 25-psi overbalance. These tests were conducted at 170° F. The breakthrough time with high overbalance was longer than typical, open-hole horizontal gravel pack operation with shunt tubes (Alternate Path Technique), indicating that the leakoff into the formation would be minimal during gravel packing provided that the external cake remains intact. Furthermore, the results at low overbalance indicate that breakthrough times (about 13 hours) are within the time scales involved during the trip out with the work string and in with the production tubing. Note that a mechanical fluid loss control device would be isolating the open hole section during the trip, and thus the open hole would be at balanced conditions. Considering the round trip time is typically 24–48 hours, the filter cake would be removed by the time the well is put on production. Experiments conducted with 7.5% HCl in the internal phase showed significantly lower breakthrough times compared to chelating agent solution. For example, at 25 psi overbalance, HCl system yields about 6-hours versus about 13-hours for chelating agent solution.

Figure 4:
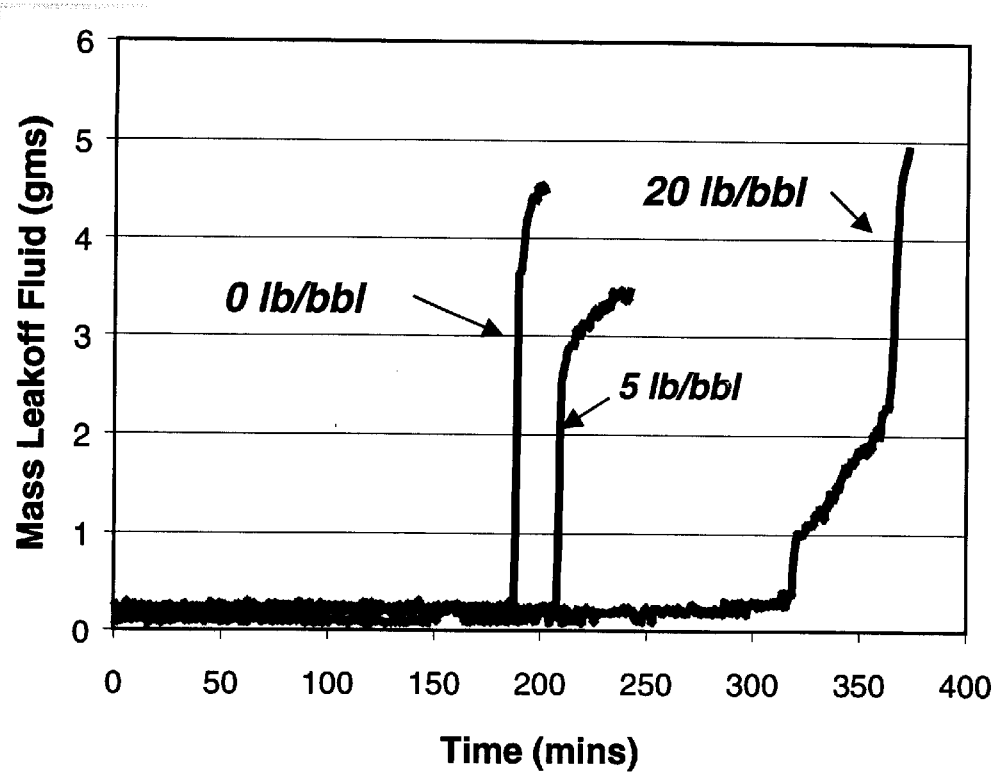
FIG. 4 shows the effect of drill solids on filter cake breakthrough kinetics.

FIG. 4 shows the effect of varying drill solids concentration on filter cake breakthrough kinetics. Three experiments were run with 0, 5, and 20 lb/bbl drill solids respectively in synthetic oil based—reservoir drilling fluid formulation. Filter cake was allowed to soak at 170° F. and 300-psi overbalance, and a carrier fluid was injected, leakoff volume was measured. For this test, a 50% chelating agent solution with a pH of 2.5 was used in the internal aqueous phase of the gravel pack carrier fluid. Note that the breakthrough time varied from 180 minutes with no drill solids to 310 minutes with 20 lb/bbl drill solids. Thus, the breakthrough times are significantly prolonged with increased amounts of drill solids in the filter cake.

Figure 5:
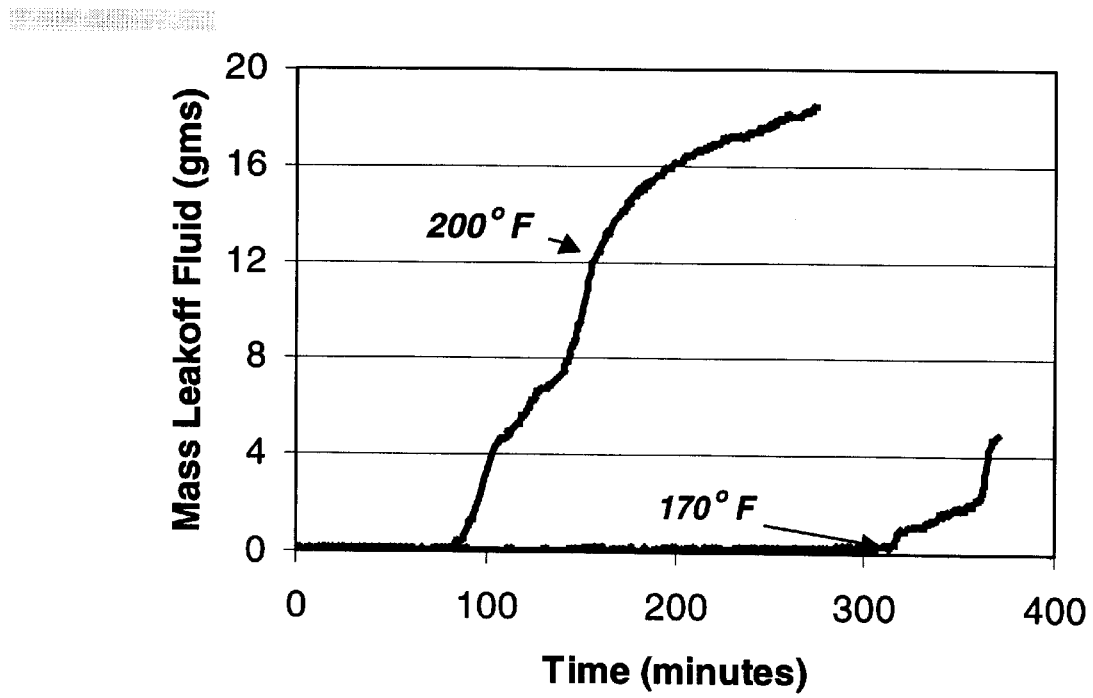
FIG. 5 shows the effect of soak temperature on filter cake cleanup.

In order to investigate the effect of temperature on breakthrough kinetics, two tests were run at identical conditions, one at 170° F. and the other at 200° F. As seen in FIG. 5, the breakthrough time of about 90 minutes at 200° F. was about a factor of 3 shorter than that at 170° F. Depending on the length of the interval to be gravel-packed, chelating agent solution systems with higher pH may be needed at elevated temperatures.

Figure 6:
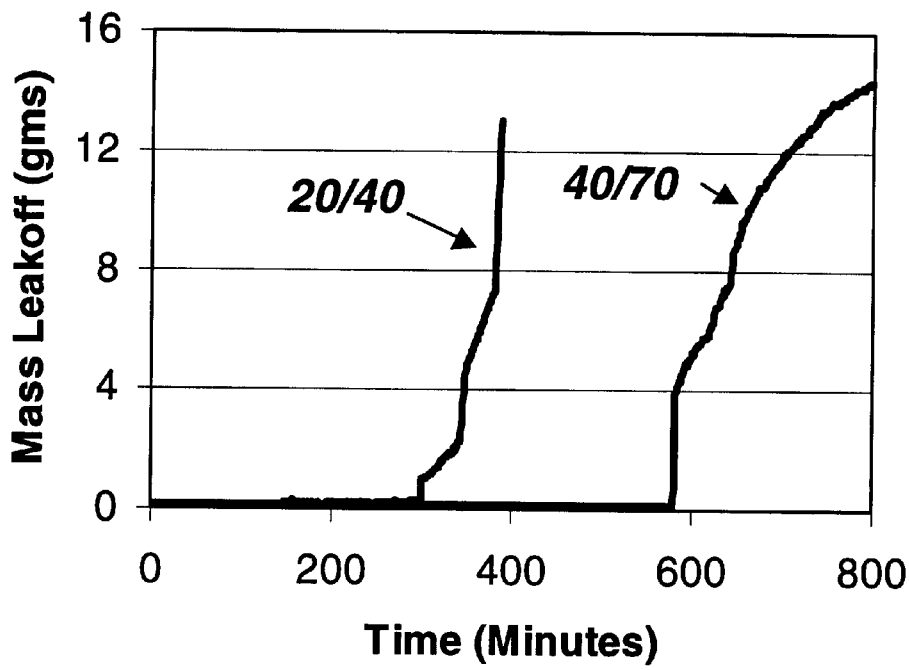
FIG. 6 shows the effect of gravel size on filter cake cleanup kinetics.

In the last series of experiments, the gravel size was varied to determine its effect on filter cake cleanup kinetics. Experiments were run to first form a filter cake using the procedure mentioned previously. Gravel pack was placed using 20/40-mesh gravel in one experiment and 40/70-mesh in another. In both experiments, an emulsion carrier fluid with 50% chelating agent solution (pH=2.5) in the internal phase was used. Leakoff volume was monitored as a function of time. As seen in FIG. 6, there is a significant dependence of breakthrough kinetics with respect to gravel mesh size: about 310 minutes for 20/40 versus about 500 minutes for 40/70.

The type of experiments reported above aim to determine breakthrough time scales in order to predict whether losses should be expected during gravel packing with a particular cleanup system. The objective is to delay breakthrough time beyond the gravel packing time scales but ensure that break occurs when the well is ready to be put on production. As such, these experiments would not be representative for retained permeability estimates. Thus, a separate set of experiments was conducted. In these tests, a 300-psi overbalance was used during the first 2-hours of the soak (representing the gravel packing period) and then the soak was continued at balanced conditions (representing conditions during the round trip, when a fluid loss valve is used). These tests indicated that the flow initiation pressures (FIP) were typically 1–3 psi with cleanup versus 7–12 psi without cleanup, and the corresponding retained permeabilities were 55–60% without cleanup and 85–95% with cleanup, all with 20/40 gravel. Similar experiments with 40/70 gravel showed that the FIP without cleanup was 15–18 psi and 4–5 psi with cleanup. The retained permeabilities without and with cleanup were 40–45% and 70–80%, respectively.

EXAMPLE 3

Water Based Gravel Pack Carrier Fluids

In the tests reported in Example 3, a viscoelastic surfactant fluid with high brine tolerance and temperature stability was used as the gravel-packing fluid. The test procedures and the materials (cores and synthetic oil based—reservoir drilling fluid formulations) used were similar to those discussed in Example 2, with the exception of using a viscoelastic surfactant—based gravel pack fluid formulation as opposed to a synthetic oil based carrier fluid.

Figure 7:
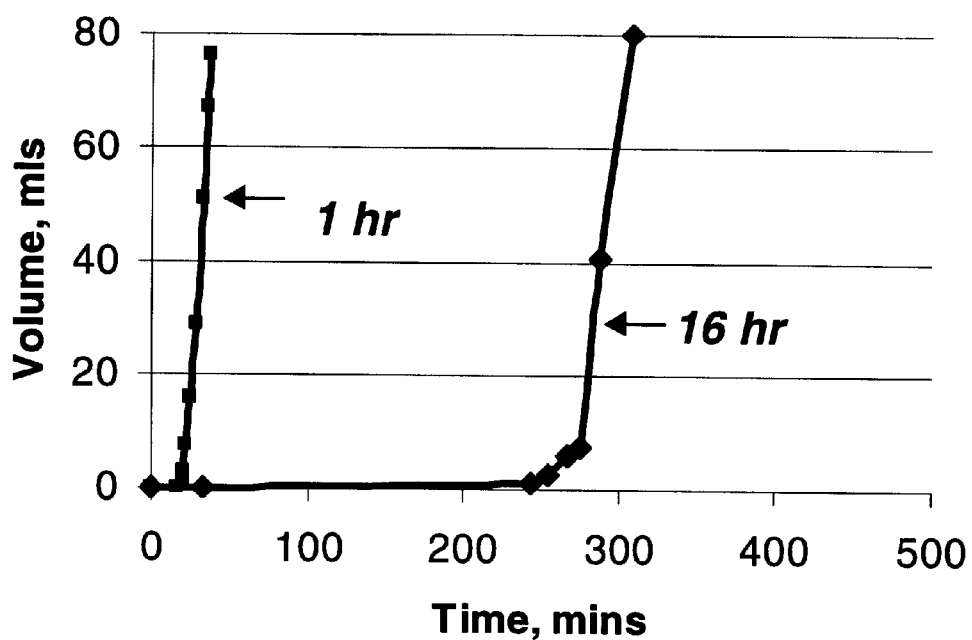
FIG. 7 shows the effect of mud-off time on filter cake cleanup kinetics: synthetic oil based reservoir drilling fluid cleanup with water based gravel pack carrier fluid containing viscoelastic surfactant/chelating agent solution.

In the first two tests shown in FIG. 7, a filter cake was formed with synthetic oil based—reservoir drilling fluid formulation given in Table 1 at 170° F. and 300 psi overbalance over 1 hour in the first test and 16 hours in the second. The excess reservoir drilling fluid was then replaced with a carrier/soak fluid formulation consisting of 3% by volume viscoelastic surfactant viscosified in a solution of 50% by volume chelating agent solution ($CaCO_3$-dissolver and protonating agent) in sodium bromide brine. The density of the carrier fluid was 10.6 ppg. The breakthrough time was a function of time during which the filter cake was allowed to build during the test (mud-off time), suggesting that laboratory testing must be conducted at conditions representative of field practices. Furthermore, it should be noted that the time for breakthrough after 16-hour mud-off is considerably longer than the time required to gravel pack a 1,000-ft open hole horizontal using the shunt technique. This means that the carrier fluid would not leak off into the formation during gravel packing unless the filter cake was mechanically removed (e.g., cake erosion).

A baseline test without any cleanup was also conducted using viscoelastic surfactant without chelating agent solution as the carrier fluid. This test resulted in a flow initiation pressure (FIP) of 13 psi and a retained permeability of 60% compared to 1 psi FIP and 95% retained permeability in the second test described above with viscoelastic surfactant/chelating agent solution fluid (16-hour mud-off). The practical significance of these differences in FIPs and retained permeabilities may vary depending on the specific reservoir conditions and reservoir drilling fluid composition. In formations with several Darcies of permeability, 13-psi FIP can be comparable to the expected draw-down, necessitating cleanup. Similarly, in formations with significant permeability variation, higher permeability intervals may cleanup while the lower permeability sections may not if the well is put on production without any cleanup treatment (either included in the gravel pack carrier fluid or as a post-gravel-pack breaker treatment), since FIP increases with decreasing permeability.

Figure 8:
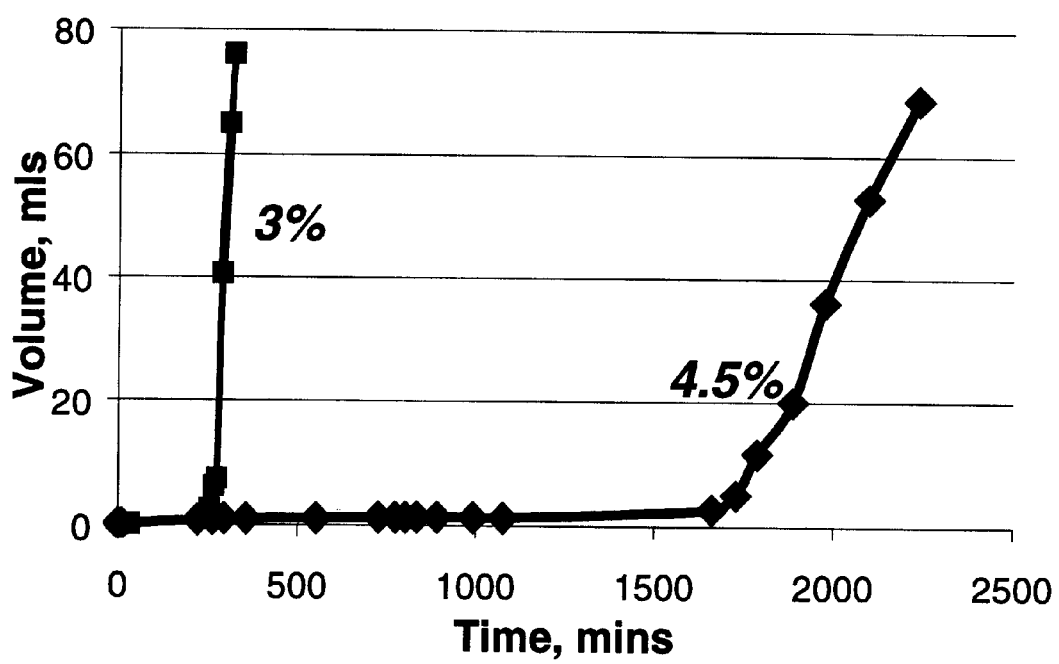
FIG. 8 shows the effect of carrier fluid viscosity on filter cake breakthrough times for synthetic oil based drilling fluid.

FIG. 8 shows the effect of carrier fluid viscosity on breakthrough times for synthetic oil based reservoir drilling fluid filter cakes. A first carrier fluid was prepared with an aqueous phase comprising 3% of a viscoelastic surfactant while the viscoelastic surfactant was of 4.5% for the second carrier fluid. The ability to tailor viscosity to achieve longer breakthrough times allows the operator to place cleanup systems in a wellbore with sufficient time to trip out of hole and run a completion without incurring massive fluid loss until the completion is nippled up, if either a mechanical fluid loss device has not been installed or the device failed to control losses. This has proven to be quite successful in horizontal slotted liner/standalone screen applications as well as shunt tube open hole gravel pack environments.

The preceding description of specific embodiments of the present invention is not intended to be a complete list of every possible embodiment of the invention. Persons skilled in this field will recognize that modifications can be made to the specific embodiments described here that would be within the scope of the present invention.

What is claimed is:

1. A method of gravel packing a hole in a subterranean formation, a part of the formation adjacent to the hole having a filter cake coated thereon, said filter cake comprising an oil-external emulsion, said method comprising the step of injecting into the hole a gravel pack composition comprising gravel and a carrier fluid comprising an aqueous phase and further comprising the step of breaking or inverting the filter cake emulsion.

2. The method of claim 1, wherein the carrier fluid comprises an emulsion and further comprising the step of breaking or inverting the carrier fluid while simultaneously breaking or inverting the filter cake emulsion.

3. The method of claim 2, wherein the step of breaking or inverting the carrier fluid while simultaneously breaking or inverting the filter cake emulsion is performed by injecting a breaking composition after the step of injecting the gravel pack composition.

4. The method of claim 2, wherein the carrier fluid comprises an internal breaking composition to perform the step of breaking or inverting the carrier fluid while simultaneously breaking or inverting the filter cake emulsion.

5. The method of claim 2, wherein the filter cake emulsion is stable at pH greater than about 8 and the aqueous phase comprises a pH modifying agent selected from the group consisting of hydrochloric acid, formic acid and citric acid.

6. The method of claim 1, wherein the filter cake emulsion is stable in a first pH range and the aqueous phase of the carrier fluid has a pH outside said first pH range.

7. The method of claim 1, wherein the aqueous phase of the carrier fluid further comprises a chelating agent.

8. The method of claim 7, wherein the chelating agent is selected from the group consisting of di-cationic salts of ethylenediaminetetraacetic acid (EDTA), cyclohexylene dinitrilo tetraacetic acid (CDTA), [ethylenebis (oxyethylenenitrilo)]tetraacetic acid (EGTA) and [[(carboxymethyl)imino]-bis(ethylenenitrilo)]-tetra-acetic acid, hydroxyethylethylenediaminetriacetic acid (HEDTA) and hydroxyethyliminodiacetic acid (HEIDA).

9. The method of claim 1, wherein the carrier fluid comprises a water-in-oil emulsion.

10. The method of claim 9, wherein about 50–70% by volume of the carrier fluid is aqueous phase.

11. The method of claim 1, wherein the carrier fluid comprises an emulsion and wherein the filter-cake emulsion is broken by injecting into the wellbore a breaker composition that comprises a solvent and at least one surfactant, said breaker composition simultaneously breaking the carrier fluid emulsion.

12. The method of claim 11, wherein the solvent comprises an alkoxylated aliphatic alcohol solvent having from 4 to 20 carbon atoms).

13. The method of claim 12, wherein the solvent comprises 2-butoxyethanol.

14. A method of simultaneously gravel packing an open hole of a wellbore and removing filter cake from a subterranean formation adjacent to the open hole, the filter cake comprising a water in oil emulsion that is stable at pH greater than about 8; the method comprising the step of injecting into the wellbore a gravel pack composition that comprises gravel and a carrier fluid, wherein the carrier fluid comprises a water in oil emulsion having a continuous oil phase and a discontinuous aqueous phase, and wherein the aqueous phase comprises a solution of mineral acid or organic acid, whereby the pH of the aqueous phase is less than about 8; wherein the injection of the gravel pack composition simultaneously deposits gravel at or adjacent to the open hole of the wellbore and removes sufficient filter cake to establish a fluid flow path between the wellbore and the formation.

15. A method of simultaneously gravel packing an open hole of a wellbore and removing filter cake from a subterranean formation adjacent to the open hole, the wellbore having been drilled at least in part with an oil based drilling fluid, the filter cake comprising a water in oil emulsion that is stable in a first pH range; the method comprising the step of injecting into the wellbore a gravel pack composition that comprises gravel and a carrier fluid, wherein the carrier fluid comprises an aqueous continuous phase that comprises a gelled viscoelastic agent and ethylenediaminetetraacetic acid (EDTA), and wherein the aqueous phase has a pH outside the first pH range.

* * * * *